United States Patent
Hosko et al.

(10) Patent No.: US 11,817,693 B2
(45) Date of Patent: Nov. 14, 2023

(54) ELECTRONIC TRIP UNIT WITH THERMAL CAPACITY MEASUREMENT AND DISPLAY

(71) Applicant: EATON INTELLIGENT POWER LIMITED, Dublin (IE)

(72) Inventors: Daniel A. Hosko, Pittsburgh, PA (US); James L Lagree, Robinson Township, PA (US); Donald T. McComas, Oakdale, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 211 days.

(21) Appl. No.: 17/514,236

(22) Filed: Oct. 29, 2021

(65) Prior Publication Data

US 2023/0139908 A1     May 4, 2023

(51) Int. Cl.
   *H02H 3/04*         (2006.01)
   *H01H 61/00*      (2006.01)

(52) U.S. Cl.
   CPC .......... *H02H 3/04* (2013.01); *H01H 2061/006* (2013.01)

(58) Field of Classification Search
CPC .......... H02H 3/04; H02H 3/042; H02H 3/044; H02H 3/066; H02H 3/08; H02H 3/09; H02H 3/027; H01H 2061/006
See application file for complete search history.

(56) References Cited

U.S. PATENT DOCUMENTS

| | | | | |
|---|---|---|---|---|
| 5,283,708 A | * | 2/1994 | Waltz ...................... | H02H 1/066 |
| | | | | 361/103 |
| 2007/0165349 A1 | * | 7/2007 | Parker .................. | H02H 1/0015 |
| | | | | 361/103 |
| 2009/0140871 A1 | | 6/2009 | Titus | |
| 2012/0126785 A1 | | 5/2012 | Paik et al. | |
| 2018/0198271 A1 | * | 7/2018 | Morimoto ................ | H02H 3/44 |

FOREIGN PATENT DOCUMENTS

| | | |
|---|---|---|
| CN | 103 580 007 A | 2/2014 |
| EP | 1 037 353 A2 | 9/2000 |

OTHER PUBLICATIONS

European Patent Office "extended European search report" for corresponding European Patent Application No. 22203090.0, dated Mar. 27, 2023, 8 pp.

* cited by examiner

*Primary Examiner* — Nguyen Tran
(74) *Attorney, Agent, or Firm* — Eckert Seamans Cherin & Mellott, LLC

(57) ABSTRACT

Systems and methods for providing information about thermal overload conditions and near-miss tripping events in a circuit interrupter are disclosed. The systems and methods provide a user with detailed information about thermal overload and near-miss tripping events, including how much time remains until a trip will be initiated due to a thermal overload, and what the real-time thermal capacity of the circuit interrupter is after a thermal overload condition ends.

18 Claims, 3 Drawing Sheets

ELECTRONIC TRIP UNIT WITH THERMAL CAPACITY MEASUREMENT AND DISPLAY

BACKGROUND

Field

The disclosed concept relates generally to circuit interrupters, and in particular, to capturing information about thermal overload events in a circuit interrupter.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit causes the operating mechanism to trip open the separable contacts.

One category of fault conditions that can cause a circuit breaker trip unit to initiate a trip is an overcurrent thermal overload. Low level currents that are over the limit of the circuit breaker rating are dangerous and can cause insulation breakdowns or fires. These thermal overload conditions are measured by multiplying the square of the overcurrent amperage by the length of time over which the overload occurs to obtain an energy value $I^2t$. This $I^2t$ energy of the thermal overload fault is configured for the application capability and tracked by the circuit breaker trip unit. In addition to providing a mechanism for indicating that a trip was caused by a thermal overload, it is often desirable for a circuit breaker to provide a mechanism for indicating that a thermal overload came close to causing a trip but did not actually cause a trip. Circuit breakers typically include some type of alarm for indicating that a "near-miss" event occurred wherein the breaker came close to tripping due to a thermal overload, however, these alarms are generally binary in nature and only indicate that a near-miss event occurred but do not provide detailed information about how close the breaker came to tripping. This information can be crucial, as the levels of current that trigger a thermal overload alarm can vary widely. For example, a lower thermal overload may not cause a trip for several minutes while a higher thermal overload may cause a trip within seconds.

There is thus room for improvement in capturing information about thermal overload events in circuit interrupters.

SUMMARY

These needs and others are met by embodiments of the disclosed concept in which an electronic trip unit for a circuit interrupter provides information to a user about thermal overload conditions and near-miss tripping events in the circuit interrupter, including how much time remains until a trip will be initiated due to a thermal overload, and what the real-time thermal capacity of the circuit interrupter is after a thermal overload condition ends.

In accordance with one aspect of the disclosed concept, an electronic trip unit for a circuit interrupter comprises: a processor and a user interface. The processor includes a timer and is structured to receive an output of a current sensor sensing current flowing through a busbar of the circuit interrupter. The processor is configured to detect a thermal overload condition in the circuit interrupter based on the sensed current, to determine a countdown of how much time remains until a maximum thermal capacity of the circuit interrupter is exceeded after detection of the thermal overload condition, to determine the present thermal capacity of the circuit interrupter upon exiting the thermal overload condition, and to display the countdown and the present thermal capacity on the user interface. The electronic trip unit is configured to initiate a trip of the circuit interrupter if the sensed current exceeds the maximum thermal capacity.

In accordance with another aspect of the disclosed concept, a circuit interrupter comprises: a first terminal and a second terminal, a busbar disposed between the first terminal and the second terminal, separable contacts structured to be moveable between a closed position and an open position such that the first and second terminals are electrically disconnected from each other when the separable contacts are in the open position, an operating mechanism structured to open and close the separable contacts, a current sensor configured to sense current flowing through the busbar, and an electronic trip unit structured to actuate the operating mechanism. The electronic trip unit comprises a processor and a user interface. The processor includes a timer and is structured to receive an output of a current sensor sensing current flowing through a busbar of the circuit interrupter. The processor is configured to detect a thermal overload condition in the circuit interrupter based on the sensed current, to determine a countdown of how much time remains until a maximum thermal capacity of the circuit interrupter is exceeded after detection of the thermal overload condition, to determine the present thermal capacity of the circuit interrupter upon exiting the thermal overload condition, and to display the countdown and the present thermal capacity on the user interface. The electronic trip unit is configured to initiate a trip of the circuit interrupter if the sensed current exceeds the maximum thermal capacity.

In accordance with another aspect of the disclosed concept, a method of informing a user of a circuit interrupter that a thermal overload condition is present in the circuit interrupter comprises: providing a current sensor and an electronic trip unit, the current sensor being structured to sense current flowing through a busbar of the circuit interrupter, and the electronic trip unit comprising a user interface and a processor. The processor comprises a timer and is structured to receive an output of the current sensor. The method further comprises: detecting, with the processor, a thermal overload condition in the circuit interrupter based on the sensed current; determining, with the processor, after detection of the thermal overload condition, a countdown of how much time remains until a maximum thermal capacity of the circuit interrupter is exceeded; determining, with the processor, upon the current decreasing such that the circuit interrupter exits the thermal overload condition, the present thermal capacity of the circuit interrupter; and displaying the countdown and the present thermal capacity on the user interface.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
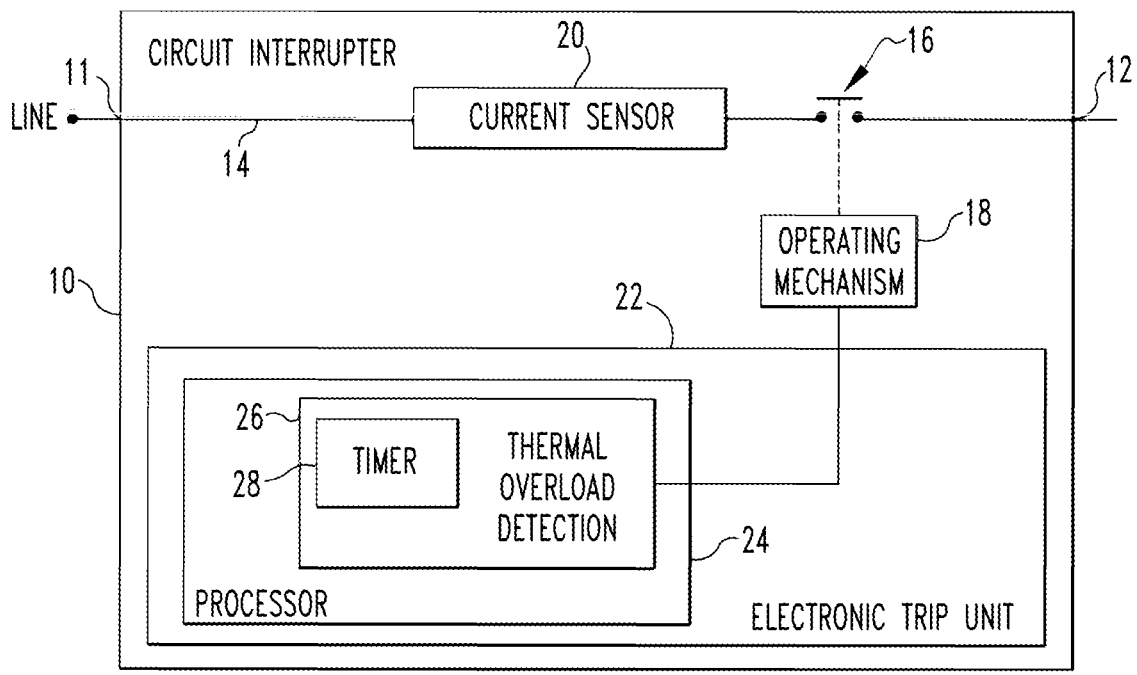
FIG. 1 is a schematic diagram of a circuit interrupter including a thermal overload detector in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "movably coupled" means that two components are coupled so as to allow at least one of the components to move in a manner such that the orientation of the at least one component relative to the other component changes.

As employed herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

FIG. 1 is a schematic diagram of a circuit interrupter 10 in accordance with an example embodiment of the disclosed concept. The circuit interrupter 10 includes a first terminal 11, a second terminal 12, a line conductor 14 connecting the first terminal 11 and second terminal 12, separable contacts 16, and an operating mechanism 18. The line conductor 14 may be comprised of one or more busbars. The separable contacts 16 are disposed along the line conductor 14 such that tripping open the separable contacts 16 stops current from flowing through the line conductor 14 from the first terminal 11 to the second terminal 12. The operating mechanism 18 is structured to trip open the separable contacts 16.

The circuit interrupter 10 also includes a current sensor 20 structured and disposed to sense current flowing through the line conductor 14 (i.e., the busbars of the line conductor 14). However, it will be appreciated that the current sensor 20 may also be employed to sense current flowing through a neutral conductor without departing from the scope of the disclosed concept. The circuit interrupter 10 further includes an electronic trip unit 22 with a processor 24. Processor 24 may comprise, for example and without limitation, a microprocessor. The processor 24 includes a thermal overload detection module 26 with a timer 28, and is structured to receive the output of the current sensor 20 and to detect faults in the circuit interrupter 10 based on the sensed current. In response to detecting a fault, the electronic trip unit 22 is structured to cause the operating mechanism 18 to trip open the separable contacts 16. The thermal overload detection module 26 encompasses software and/or firmware instructions for executing overload detection functions, as detailed herein with respect to the remaining figures.

Figure 2:
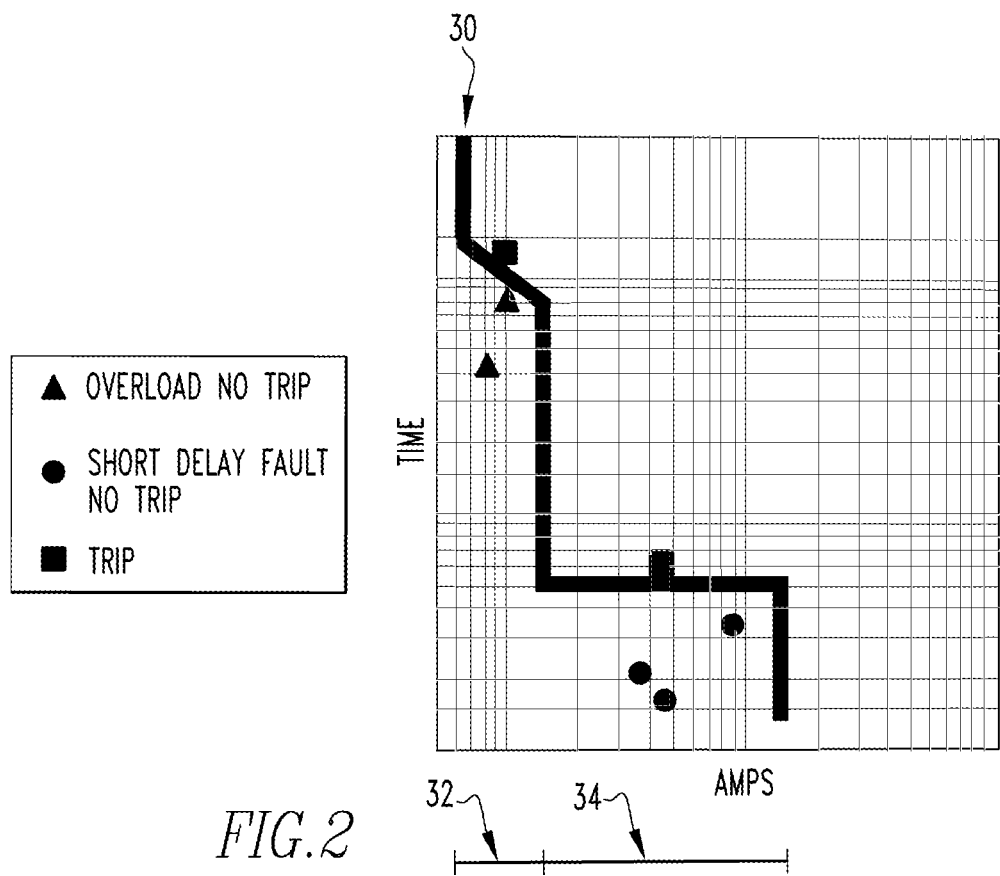
FIG. 2 is an illustrative example of a trip curve that can be used by a thermal overload detector of the circuit interrupter shown in FIG. 1 in accordance with an example embodiment of the disclosed concept.

Referring now to FIG. 2, a graph of an overcurrent trip curve 30 is shown. The thermal overload detector 26 of circuit interrupter 10 is configured to determine, in accordance with a trip curve such as trip curve 30, how long an overcurrent condition should be permitted to persist before the electronic trip unit 22 initiates a trip. The trip curve 30 plots time (t) against amperes squared ($I^2$) and depicts how quickly a trip will be initiated at various overcurrent levels. It should be noted that trip curve 30 is plotted logarithmically on both the x- and y-axes. The x-axis depicts current levels that are expressed as multiples of the current rating of circuit interrupter 10 such that, for a current rating of R, each increment on the x-axis can be expressed as nR, wherein n is an integer. The y-axis denotes the amount of time that has elapsed since the current flowing through the circuit interrupter 10 has reached a given amperage.

Still referring to FIG. 2 and trip curve 30, three different types of data points reflecting events captured by a thermal overload detector 26 are displayed on the graph, as noted in the legend. The three types of data points displayed are: overload no trip (referred to hereinafter as "overload"), short delay fault no trip (referred to hereinafter as "short delay fault"), and trip. It should be noted that any values falling below trip curve 30 are indicative of current levels and durations that do not cause the trip unit 22 to initiate a trip, and that any values occurring above trip curve 30 are indicative of current levels and durations that do cause the trip unit 22 to initiate a trip. It will be appreciated that it is often desirable for circuit interrupters such as circuit interrupter 10 to have either or both short delay and long delay settings activated so that transient overcurrent conditions do not cause the circuit interrupter to trip, and the presence of both overload and short delay fault data points in FIG. 2 indicates activation of both short delay and long delay settings.

It will be further appreciated that relatively lower overcurrent conditions can be permitted to persist for a longer period of time before initiating a trip, and that relatively higher overcurrent conditions should only be permitted to persist for a short period of time before initiating a trip. The relatively lower overcurrent conditions that can persist for a longer period of time are referred to as overload, and the relatively higher overcurrent conditions that should only persist for a shorter period of time are referred to as short delay faults. The left-hand portion of trip curve 30 as denoted by reference number 32 is the region in which overload faults occur, as data points falling under the trip curve 30 in this region have lower amperage values and correspond to more time having elapsed relative to the right-hand side of the curve 30. The right-hand portion of trip curve 30 denoted by reference number 34 is the region in which short delay faults occur, as data points falling under the trip curve 30 in this region have higher amperage values and correspond to less time having elapsed relative to the left-hand side of the curve 30. The innovations of the present disclosure are directed toward activity occurring in the overload region 32 rather than in the short delay fault region 34.

Continuing to refer to FIG. 2, as previously stated, the thermal overload detector 26 of circuit interrupter 10 is configured to determine, in accordance with a trip curve such as trip curve 30, how long an overcurrent condition should be permitted to persist before the electronic trip unit 22 initiates a trip. It is expected that the thermal energy of current levels occurring above trip curve 30 may cause components of the circuit interrupter 10 to melt and/or catch on fire within a relatively short amount of time, which is why the trip data points in FIG. 2 occur just above the trip curve 30 in both the overload region 32 and the short delay fault region 34. Current levels below the trip curve 30 are said to be at or below the maximum thermal capacity of the circuit interrupter 10 (it will be appreciated that current levels falling just below the trip curve are considered to be at or near maximum capacity), and current levels above the trip curve 30 are said to exceed the maximum thermal capacity of the circuit interrupter 10.

Any level of current considered high enough to necessitate monitoring is referred to as a pickup level. Current that reaches the magnitude of a pickup level triggers the timer 28 of thermal overload detector 26. For each given level of current within the area under the trip curve 30 in FIG. 2, the given current level can continue to flow for a predetermined length of time (in accordance with the trip curve 30), as monitored by timer 28, before the trip unit 22 initiates a trip. The timer 28 is configured to run for as long as the current remains at or above the pickup level. The length of time that a given pickup level of current can flow encompasses a tolerance level, as denoted by the thickness T of curve 30. For example and without limitation, if a pickup current of 300 A should generally only be allowed to flow for 100 seconds before the trip unit 22 initiates a trip, for a chosen tolerance level of ±10%, a current of 300 A may cause a trip after flowing for as little as 90 seconds (90% of 100 s) or could flow for as long as 110 seconds (110% of 100 s) before causing a trip, depending on what other factors the trip unit 22 is programmed to take into account before initiating a trip.

Still referring to FIG. 2, the trip unit 22 determines the thermal energy of the current flowing through the circuit interrupter 10 for current values within the overload region 32 using the following thermal energy formula:

$$K = I^2 t \quad (1)$$

wherein I is current in amperes, t is time in seconds, and K is a value directly proportional to the thermal energy of the current. A non-limiting illustrative example of how thermal overload detector 26 uses the thermal energy formula (1) to determine whether a thermal overload condition exists is now provided. In this non-limiting example, the current rating of circuit interrupter 10 is 100 A, the slope of trip curve 30 within the overload region 32 is chosen to be set at 6 times the current rating, and the user of circuit interrupter 10 chooses to set a time delay of 20 seconds for this particular overload condition (i.e. chooses to allow current that is 6 times the magnitude of the rated current of 100 A to persist for up to 20 seconds before the trip unit 22 initiates a trip). Applying formula (1), the thermal energy factor K is determined to be 7,200,000 A²s:

$$K = I^2 t$$

$$K = (6 * 100A)^2 * (20s)$$

$$K = 7,200,000 A^2 s$$

The amount of time that other overload currents can persist for this particular set of conditions in this example is then determined based on the K value of 7,200,000 A²s. For instance, an overload of 200 A could persist for 180 seconds based on the K factor of 7,200,000 A²s:

$$K = I^2 t$$

$$7,200,000 A^2 s = (200A)^2 * t$$

$$t = 180s$$

As the preceding example demonstrates, the value of the K factor changes in accordance with the length of the overload delay chosen by the user and the slope of the trip curve 30 in the overload region 32. It should be noted that, because the user of the circuit interrupter is able to choose the length of an overload delay, not only does the processor 24 use the trip curve 30 to determine how long a pickup current can safely flow, but prior to the circuit interrupter 10 being put into service, the processor 24 actually chooses the specific trip curve 30 or generates the values for the specific trip curve 30 that corresponds to the time delay chosen by the user. In an exemplary embodiment of the disclosed concept, the circuit interrupter 10 is configured to provide the user with a discrete number of preset overload delays to choose from, and it will be appreciated that, for each of the preset delays, the processor 24 can simply be programmed to store the specific trip curve 30 corresponding to the preset delay. However, it will be appreciated that the circuit interrupter 10 can alternatively be configured to allow the user to choose the length of the overload delay within a continuous range of delay lengths, and that the processor 24 can be configured to generate the values of the trip curve 30 after the user has chosen the overload delay length (since the number of possible overload delay lengths would be much higher and storing so many corresponding trip curves 30 may not be an optimal use of memory). In addition, it will be appreciated that the circuit interrupter can also be structured to allow the user to determine the maximum magnitude of current that can flow during an overload, and that the slope of trip curve 30 in the overload region 32 would be adjusted correspondingly.

Figure 3A:
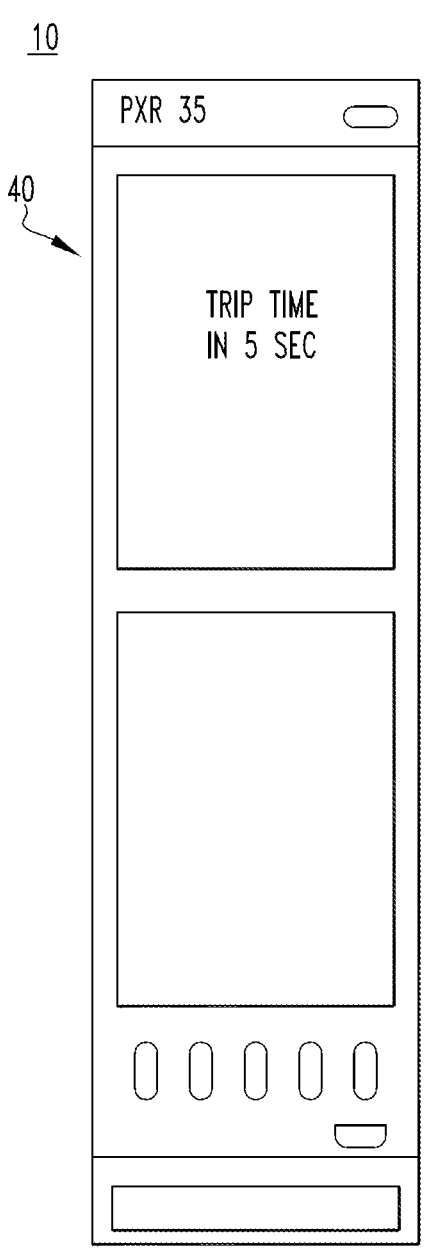
FIG. 3A shows a user interface displaying an example of thermal overload metrics that are provided to a user of the circuit interrupter shown in FIG. 1, in accordance with an example embodiment of the disclosed concept.
Figure 3B:
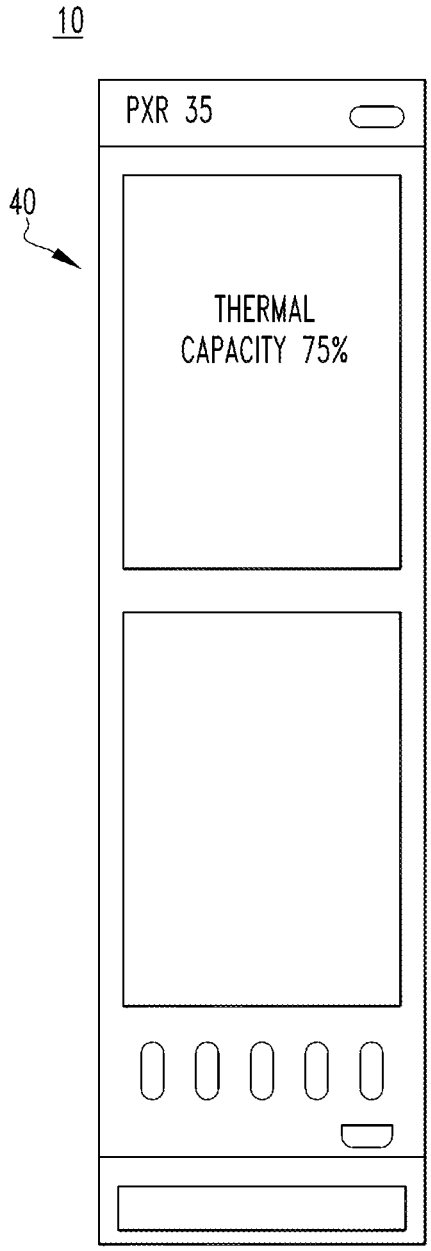
FIG. 3B shows the user interface shown in FIG. 3B displaying another example of thermal overload metrics that are provided to a user of the circuit interrupter, in accordance with an example embodiment of the disclosed concept.

Referring now to FIGS. 3A and 3B, the circuit interrupter 10 comprises a user interface 40 configured to be in electrical communication with processor 24 and to display various metrics associated with thermal overload events and compiled by thermal overload detector 26. The user interface 40 can, for example and without limitation, be included in the electronic trip unit 22. In a first non-limiting example, if the current flowing through the circuit interrupter 10 has reached a pickup level, the processor 24 is configured to use the user interface 40 to display a countdown indicating how much time remains until the thermal capacity of the circuit interrupter will be exceeded (as determined by the $I^2 t$ energy calculated for the overload event) and the trip unit 22 will initiate a trip (if the current does not decrease below a pickup level before the countdown ends), as shown in FIG. 3A. In a second non-limiting example, after a pickup level current has exited pickup, i.e. decreased below a pickup level before causing trip unit 22 to initiate a trip, the processor 24 is configured to use the user interface 40 to display the present thermal capacity of the circuit interrupter 10 as a percentage of the maximum thermal capacity, as shown in FIG. 3B. It will be appreciated that the processor 24 is configured to continually update the present thermal capacity as the current level continues to decrease or otherwise change after exiting thermal overload. The levels of current just beneath the trip curve 30 are considered to represent the maximum thermal capacity of the circuit interrupter 10. Knowing the present thermal capacity of the circuit interrupter 10 is valuable for a user because thermal capacity signifies the ability or lack thereof of the circuit interrupter 10 to handle another overload event. This is particularly true when the user is testing the trip unit 22, as the user needs to know after exiting pickup when the unit has fully cooled and is able to handle another overload.

The examples provided in FIGS. 3A and 3B are illustrative of the benefits provided by the systems and methods disclosed herein, as existing circuit breakers provide limited information about thermal overload conditions and near-miss tripping events, i.e. events in which an overload has occurred but is not great enough cause the breaker to trip. In existing breakers, alarm event captures may be generated during near-miss events, but these captures do not provide detailed information about how close the breaker came to tripping. A snapshot is taken at the time of the alarm, but the duration of the overload and behavior of the current during the near-miss overload is not captured. In these existing systems, when the current through the breaker reaches a pickup level, the pickup is typically indicated by a binary indication system such as a single LED lighting up. With such an indication system, when the LED lights up, the user is only alerted to the fact that an overload has occurred but does receive information regarding how soon tripping will occur. This leaves a significant gap in the information available to the user, as the time remaining until a trip can be anywhere from a few seconds to several minutes, depending on the magnitude of the current. Furthermore, in existing systems, after exiting pickup, a user does not know when the trip unit has fully cooled and is able to handle another overload.

Referring again to FIG. 3B and as previously stated, in a simplified sense, the present thermal capacity can be thought of as the thermal capacity associated with the maximum point on the graph of trip curve 30 that the current reached before exiting pickup, i.e. the value of K calculated from the current and time coordinates of the maximum point reached using the thermal capacity formula (1). In a more detailed sense, several factors affect how the processor 24 determines the present thermal capacity, including how much time the thermal overload detector 26 has to sample and process the current readings from the current sensor 20. Specifically, each cycle of sampling performed by the processor 24 on the measurements provided by the current sensor 20 takes a precise amount of time to complete. The number of current samples used by the processor 24 can be thought of as being collected in a "trip bucket". The size of the trip bucket is directly related to both the time delay setting chosen by the user for overload conditions and the magnitude of a pickup current. This intuitively makes sense, as setting a longer delay for overload conditions leads to a longer interval of time in which to sample the current while setting a shorter delay accordingly leads to a shorter sampling interval, and a pickup current of lesser magnitude will be able to persist for longer than a current of greater magnitude before a trip is initiated such that the processor can take more samples of the lesser magnitude current (as indicated by the downward slope of the trip curve 30 in the overload region 32). Accordingly, the longer the set delay is for overload conditions and the lesser the magnitude is of the pickup current, the more samples of current the processor 24 can take, and the larger the trip bucket is. This means that more data points are available for the calculation of thermal capacity for larger trip buckets than smaller trip buckets. This does not mean that the determinations of thermal capacity made by processor 24 for shorter delay or greater magnitude pickup current events are not accurate, but simply that less data points are used in such determinations.

Figure 4:
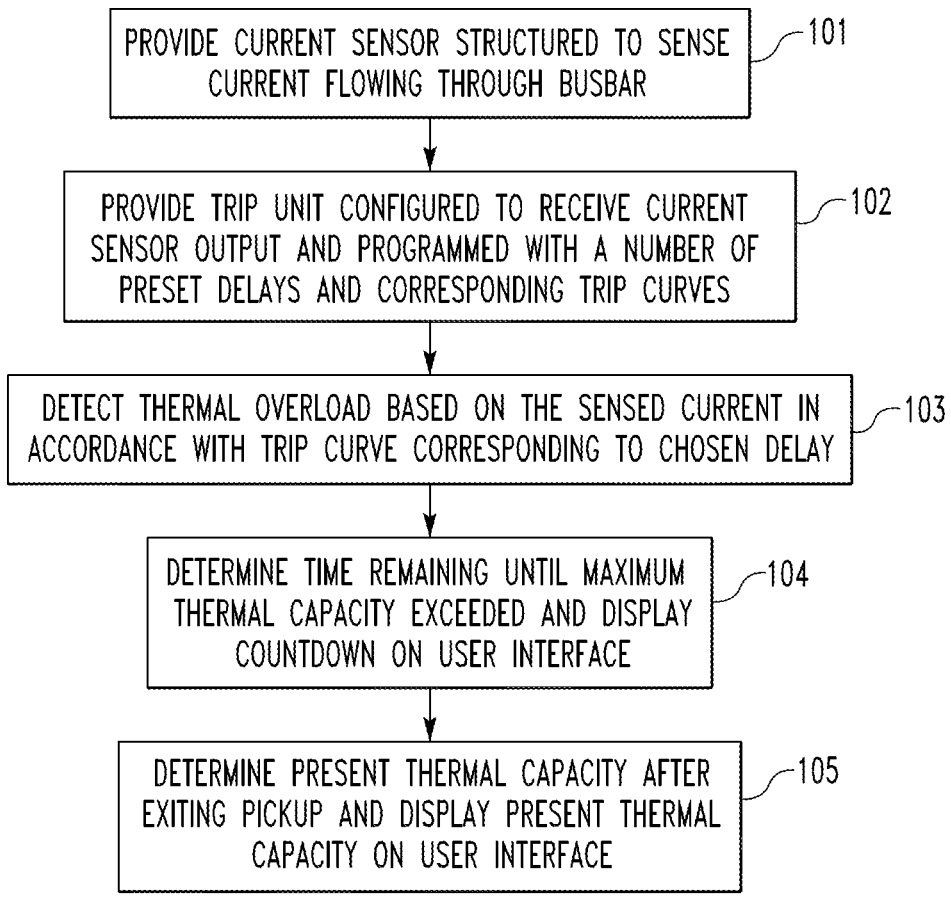
FIG. 4 is a is a flow chart of a method for providing detailed information about thermal overload and near-miss tripping events to a user of a circuit interrupter in accordance with an example embodiment of the disclosed concept.

FIG. 4 is a flowchart of a method 100 for informing a user of a circuit interrupter of the details of thermal overload conditions and near-miss tripping events, in accordance with an example embodiment of the disclosed concept. The method of FIG. 4 may be employed, for example, with the circuit interrupter 10 shown in FIG. 1 and the user interface 40 shown in FIGS. 3A and 3B, and with trip curves such as trip curve 30 shown in FIG. 2, and is described in conjunction with the circuit interrupter 10, user interface 40, and trip curve 30 shown in FIGS. 1, 2, 3A, and 3B. However, it will be appreciated that the method may be employed in other devices as well without departing from the scope of the disclosed concept.

The method begins at 101 where the current sensor 20 is provided and disposed around the line conductor busbar 14 of the circuit interrupter 10 in order to sense the current flowing through the busbar 14. At 102, the electronic trip unit 22 is provided such that the thermal overload detector 26 is configured to receive the output of the current sensor 20, and the thermal overload detector 26 is programmed with a number of stored preset overload delays and a corresponding number of trip curves 30 such that each preset delay has an associated trip curve 30. At 103, the thermal overload detector 26 detects a thermal overload condition in the circuit interrupter 10 based on the sensed current and in accordance with the trip curve corresponding to the preset delay chosen by the user. At 104, the thermal overload detector 26 determines the time remaining until the maximum thermal capacity of the circuit interrupter 10 is exceeded and the processor 24 displays a countdown of the time remaining on the user interface 40. At 105, after the current decreases from the pickup level, the thermal overload detector 26 determines the present thermal capacity of the circuit interrupter 10 and the processor 24 displays the present thermal capacity on the user interface 40.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electronic trip unit for a circuit interrupter, the trip unit comprising:
a processor comprising a timer and structured to receive an output of a current sensor sensing current flowing through a busbar of the circuit interrupter; and
a user interface,
wherein the processor is configured to detect a thermal overload condition in the circuit interrupter based on the sensed current, wherein, after detection of the thermal overload condition, the processor is configured to determine a countdown of how much time remains until a maximum thermal capacity of the circuit interrupter is exceeded, wherein, upon the current decreasing such that the circuit interrupter exits the thermal overload condition, the processor is configured to determine the present thermal capacity of the circuit interrupter, wherein the processor is configured to display the countdown and the present thermal capacity on the user interface, and wherein the electronic trip unit is configured to initiate a trip of the circuit interrupter if the sensed current exceeds the maximum thermal capacity.

2. The electronic trip unit of claim 1, wherein the processor is configured to store a number of preset delays, wherein the processor is configured to store a number of trip curves corresponding in number to the number of preset delays such that each trip curve is associated with a corresponding preset delay, wherein the electronic trip unit is configured to enable a user to choose one of the preset delays, wherein, upon detection of the thermal overload condition, the processor is configured to start the countdown, and wherein the duration of the countdown corresponds to a length of the chosen preset delay.

3. The electronic trip unit of claim 2, wherein each of the number of trip curves is structured such that, for a given trip curve, the circuit interrupter is considered to be at or below the maximum thermal capacity if the magnitude of the sensed current falls below the trip curve, and the circuit interrupter is considered to be exceeding the maximum thermal capacity if the magnitude of the sensed current falls above the trip curve.

4. The electronic trip unit of claim 3, wherein the trip curve is structured to have a width that reflects a tolerance level for the length of time that a given thermal overload level of current can flow before the electronic trip unit initiates a trip of the circuit interrupter.

5. The electronic trip unit of claim 3, wherein the present thermal capacity is displayed on the user interface as a percentage of the maximum capacity.

6. The circuit interrupter of claim 1, wherein the processor determines the present thermal capacity based on the product of the square of the sensed current and an amount of time that has elapsed since the thermal overload condition commenced.

7. A circuit interrupter comprising:

a first terminal and a second terminal;

a busbar disposed between the first terminal and the second terminal;

separable contacts structured to be moveable between a closed position and an open position, the first and second terminals being electrically disconnected from each other when the separable contacts are in the open position;

an operating mechanism structured to open and close the separable contacts;

a current sensor configured to sense current flowing through the busbar; and an electronic trip unit to structured to actuate the operating mechanism, the electronic trip unit comprising:

a processor comprising a timer and structured to receive an output of a current sensor sensing current flowing through a conductor of the circuit interrupter; and a user interface, wherein the processor is configured to detect a thermal overload condition in the circuit interrupter based on the sensed current, wherein, after detection of the thermal overload condition, the processor is configured to determine a countdown of how much time remains until a maximum thermal capacity of the circuit interrupter is exceeded, wherein, upon the current decreasing such that the circuit interrupter exits the thermal overload condition, the processor is configured to determine the present thermal capacity of the circuit interrupter, wherein the processor is configured to display the countdown and the present thermal capacity on the user interface, and wherein the electronic trip unit is configured to initiate a trip of the circuit interrupter if the sensed current exceeds the maximum thermal capacity.

8. The circuit interrupter of claim 7, wherein the processor is configured to store a number of preset delays, wherein the processor is configured to store a number of trip curves corresponding in number to the number of preset delays such that each trip curve is associated with a corresponding preset delay, wherein the electronic trip unit is configured to enable a user to choose one of the preset delays, wherein, upon detection of the thermal overload condition, the processor is configured to start the countdown, and wherein the duration of the countdown corresponds to a length of the chosen preset delay.

9. The circuit interrupter of claim 8, wherein each of the number of trip curves is structured such that, for a given trip curve, the circuit interrupter is considered to be at or below the maximum thermal capacity if the magnitude of the sensed current falls below the trip curve, and the circuit interrupter is considered to be exceeding the maximum thermal capacity if the magnitude of the sensed current falls above the trip curve.

10. The circuit interrupter of claim 9, wherein the trip curve is structured to have a width that reflects a tolerance level for the length of time that a given thermal overload level of current can flow before the electronic trip unit initiates a trip of the circuit interrupter.

11. The circuit interrupter of claim 9, wherein the present thermal capacity is displayed on the user interface as a percentage of the maximum capacity.

12. The circuit interrupter of claim 7, wherein the processor determines the present thermal capacity based on the product of the square of the sensed current and an amount of time that has elapsed since the thermal overload condition commenced.

13. A method of informing a user of a circuit interrupter that a thermal overload condition is present in the circuit interrupter, the method comprising:

providing a current sensor structured to sense current flowing through a busbar of the circuit interrupter;

providing an electronic trip unit, the electronic trip unit comprising:

a processor comprising a timer and structured to receive an output of the current sensor; and a user interface, detecting, with the processor, a thermal overload condition in the circuit interrupter based on the sensed current;

determining, with the processor, after detection of the thermal overload condition, a countdown of how much time remains until a maximum thermal capacity of the circuit interrupter is exceeded;

determining, with the processor, upon the current decreasing such that the circuit interrupter exits the thermal overload condition, the present thermal capacity of the circuit interrupter; and displaying the countdown and the present thermal capacity on the user interface.

14. The method of claim 13, further comprising:

storing a number of preset delays in the processor;

storing a number of trip curves in the processor corresponding to the number of preset delays such that each trip curve is associated with a corresponding preset delay;

enabling a user to choose one of the preset delays; and starting the countdown upon detection of the thermal overload condition, wherein the duration of the countdown corresponds to a length of the chosen preset delay.

15. The method of claim 14, further comprising:

structuring each of the number of trip curves such that, for a given trip curve, the circuit interrupter is considered to be at or below the maximum thermal capacity if the magnitude of the sensed current falls below the trip curve, and the circuit interrupter is considered to be exceeding the maximum thermal capacity if the magnitude of the sensed current falls above the trip curve.

16. The method of claim 15, further comprising:

structuring the trip curve to have a width that reflects a tolerance level for the length of time that a given thermal overload level of current can flow before the electronic trip unit initiates a trip of the circuit interrupter.

17. The method of claim 15, further comprising:

displaying the present thermal capacity on the user interface as a percentage of the maximum capacity.

18. The method of claim 13, further comprising:

determining the present thermal capacity based on the product of the square of the sensed current and an amount of time that has elapsed since the thermal overload condition commenced.

* * * * *